United States Patent
Wojcik et al.

(10) Patent No.: US 9,092,300 B2
(45) Date of Patent: Jul. 28, 2015

(54) PERIPHERAL DEVICE AND METHOD FOR UPDATING FIRMWARE THEREOF

(71) Applicant: Otter Products LLC, Fort Collins, CO (US)

(72) Inventors: James John Wojcik, Kirkland, WA (US); Kim J. Hansen, Renton, WA (US); James Stephanick, Seattle, WA (US)

(73) Assignee: OTTR PRODUCTS, LLC, Fort Collins, CO (US)

( * ) Notice: Subject to any disclaimer, the term of this patent is extended or adjusted under 35 U.S.C. 154(b) by 73 days.

(21) Appl. No.: 13/916,496

(22) Filed: Jun. 12, 2013

(65) Prior Publication Data

US 2014/0317611 A1 Oct. 23, 2014

Related U.S. Application Data

(60) Provisional application No. 61/813,203, filed on Apr. 18, 2013.

(51) Int. Cl.
*G06F 9/44* (2006.01)
*G06F 9/445* (2006.01)

(52) U.S. Cl.
CPC *G06F 8/65* (2013.01); *G06F 8/665* (2013.01); *G06F 8/71* (2013.01)

(58) Field of Classification Search
CPC .......................................................... G06F 8/65
USPC ........................................................ 717/168
See application file for complete search history.

(56) References Cited

U.S. PATENT DOCUMENTS

| | | | |
|---|---|---|---|
| 6,253,281 B1 | 6/2001 | Hall | |
| 6,538,413 B1 | 3/2003 | Beard et al. | |
| 7,082,603 B2 | 7/2006 | Hisatake | |
| 7,089,547 B2 | 8/2006 | Goodman et al. | |
| 8,386,589 B2 | 2/2013 | Keefe et al. | |
| 8,402,109 B2 | 3/2013 | Marino et al. | |

(Continued)

FOREIGN PATENT DOCUMENTS

| | | |
|---|---|---|
| JP | 2001-051844 A | 2/2001 |
| JP | 2005-063050 A | 3/2005 |

(Continued)

OTHER PUBLICATIONS

"Downloading an S-Series Firmware Image via the Serial Port", extremenetworks.com website; Dec. 10, 2010.*

(Continued)

*Primary Examiner* — Qing Chen
*Assistant Examiner* — Clint A Thatcher

(57) ABSTRACT

A peripheral device for an electronic device includes a memory configured to store at least an active firmware image and another firmware image, and circuitry configured to execute instructions provided in the firmware image. The circuitry receives, from a software application of the electronic device, commands and a firmware image included in the software application. The circuitry verifies the received firmware image file and writes the portions to a memory block different from a memory block at which the active firmware image is located. A command from the software application causes the peripheral device to specify the newly written firmware image as an active firmware image and to execute the newly active firmware image.

17 Claims, 12 Drawing Sheets

(56) References Cited

U.S. PATENT DOCUMENTS

| | | | |
|---|---|---|---|
| 2009/0017884 A1 | 1/2009 | Rotschild | |
| 2009/0037284 A1 | 2/2009 | Lewis et al. | |
| 2011/0276807 A1* | 11/2011 | Shin | 713/189 |
| 2012/0015642 A1 | 1/2012 | Seo | |
| 2013/0047144 A1* | 2/2013 | Chalmers et al. | 717/168 |
| 2013/0314030 A1* | 11/2013 | Fathollahi | 320/107 |

FOREIGN PATENT DOCUMENTS

| | | |
|---|---|---|
| WO | 9400037 A1 | 1/1994 |
| WO | 2012074151 A1 | 6/2012 |

OTHER PUBLICATIONS

Lex Friedman; "Review: Eight iPhone 4 Battery Cases"; Macworld.com website; Sep. 2, 2011.*

Mat Smith, "Otterbox unveils iON Intelligence iPhone case with automatic power management and Defender protection"; Jan. 8, 2013.*

"Checksum"; Wikipedia.org website; Mar. 29, 2013.*

Don Reisinger; "QR code readers for your iPhone"; cnet.com website; Dec. 10, 2009.*

* cited by examiner

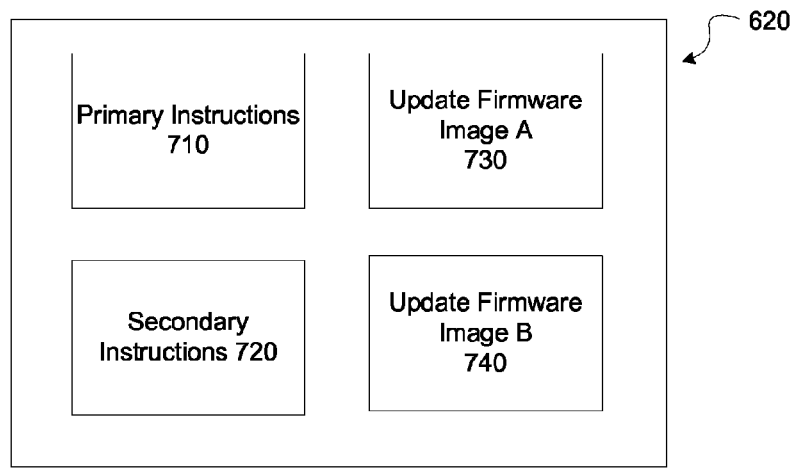
FIG. 7A
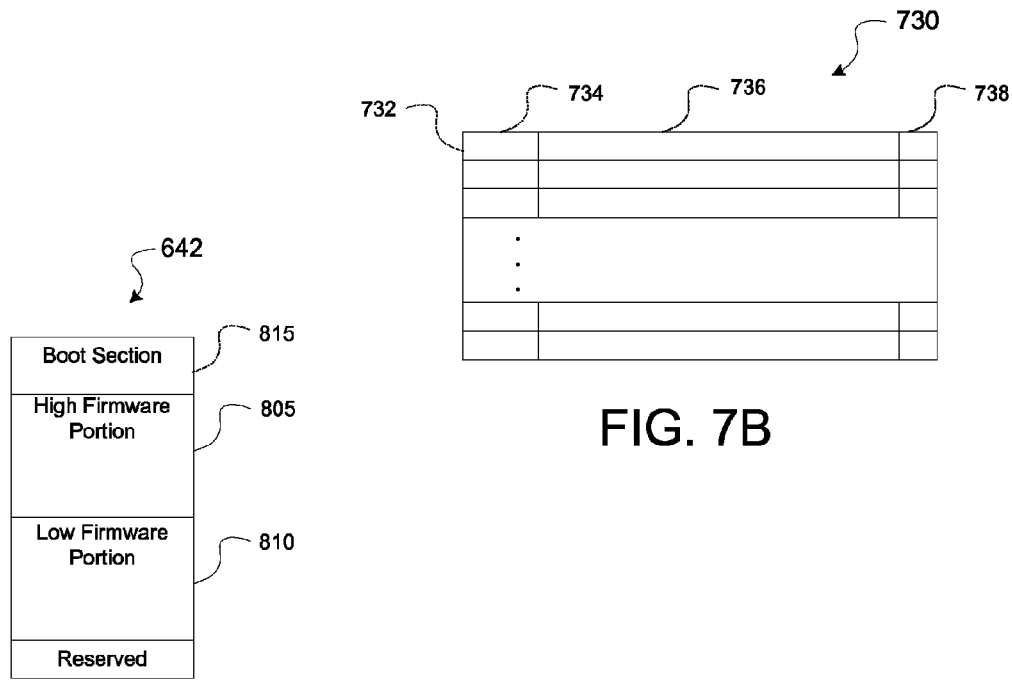
FIG. 7B
FIG. 8

PERIPHERAL DEVICE AND METHOD FOR UPDATING FIRMWARE THEREOF

This disclosure claims the benefit of priority, under 35 U.S.C. §120, to U.S. Provisional Application No. 61/813,203, the contents of which are hereby incorporated in their entirety by reference thereto.

FIELD

The present application relates to communication between an electronic device and a device peripheral to the electronic device. More specifically, the present application relates to update of firmware used by the peripheral device. Even more specifically, the present application includes embodiments for updating firmware executed by a protective case for an electronic device, the protective case including a circuitry for supplementing power for the electronic device.

BACKGROUND

Many types of portable electronic devices are used for business, information, or entertainment purposes. Portable electronic devices may include smartphones, tablets, computers, cameras, video players, mobile communication devices, electronic media readers, audio players, handheld scanners, two-way radios, global positioning system (GPS) devices, and other types of electronic computing or communication devices, including combinations of the above-identified or other devices. Moreover, a portable electronic device may include one or more processors configured to execute mobile application software, referred to colloquially (and herein) as an "app". When executed by a processor, an app may operate as, for example, a simple electronic game, word processing feature, internet browser, media player or other operation. Typically the app presents graphical information to a user of the portable electronic device, but may also operate in the background to record and/or process data or sensory information.

A portable electronic device may engage physically and/or electronically with a device that is peripheral thereto (a peripheral device). For example a protective enclosure, as peripheral device, may enclose and protect from damaging force and/or elements a portable electronic device having comparatively sensitive or fragile components. Such components may include, for example, electronic connectors, circuitry, sensors, or glass screens, which can be easily damaged if the device is exposed to elements and/or forces. A user may install a protective enclosure having a robustness chosen to provide a corresponding degree of protection for the user's phone. Other types of devices (e.g., docking stations, remote control devices, printers, etc., to name a few) may constitute a peripheral device.

In some instances circuitry of a peripheral device may execute instructions of a firmware image stored in a memory portion of the peripheral device. The firmware is read from the memory portion and executed by a processor or microcontroller of the peripheral device for performance of the peripheral device's intended function(s). For example, a protective enclosure may include a processor configured, via corresponding firmware, for monitoring and managing charge/discharge of a battery included in the protective enclosure for efficient use by the portable electronic device enclosed.

SUMMARY

Embodiments introduced herein include devices, methods and systems with various components for automatically updating firmware of a peripheral device when a user app is updated. In addition, instructions are disclosed that when executed by a processor direct the processor to perform the methods or variations thereof, or other operations described herein. While illustrative embodiments are disclosed, those of ordinary skill in the art will recognize still other embodiments apparent from the following detailed description. As will be realized, the embodiments are capable of modification in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which:

FIG. 7A is a block diagram showing elements of an app, including instructions for execution by a portable electronic device;

FIG. 7B illustrates a structure for a firmware image provided in an app;

FIG. 8 illustrates an arrangement for memory of a peripheral device, according to a disclosed embodiment;

DETAILED DESCRIPTION

Figure 1:
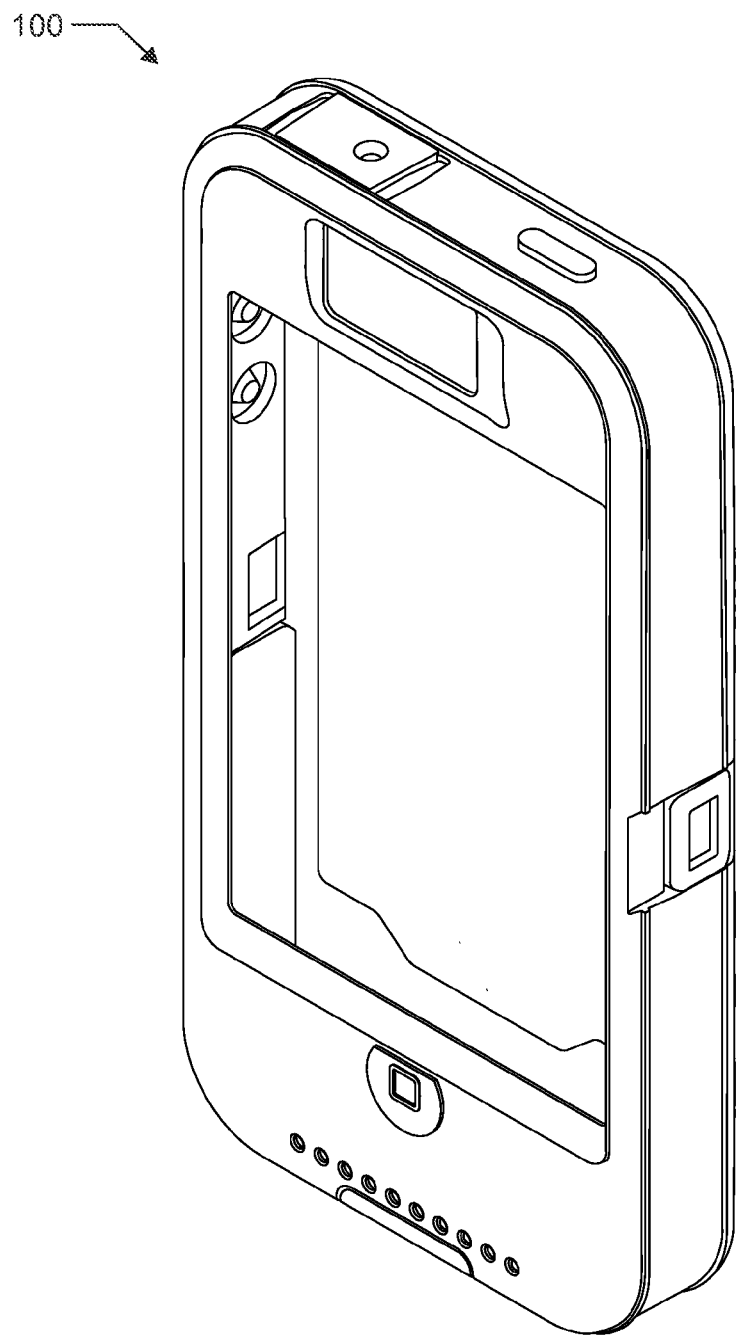
FIG. 1 shows a perspective view of a protective case, as peripheral device for a portable electronic device.

Among other embodiments, the present disclosure details a peripheral device, for a portable electronic device, and a method for updating firmware for execution by the peripheral device. A peripheral device for a portable electronic device may include circuitry that performs a function separate from and/or complementary to functions performed by the portable electronic device. For example, a peripheral device may be a protective enclosure that includes a battery and circuitry for supplementing a battery of the portable electronic device.

For a variety of reasons it may become appropriate to change or replace firmware of the peripheral device in order to, for example, add, enhance, limit, change, or repair existing functions performed by the peripheral device. Firmware updates may be effected by physically replacing media (e.g., flash memory) upon which the firmware is stored, or by "flashing" the existing media with a new firmware image to replace the existing firmware image. Physical replacement of firmware media is not convenient and may be technically unfeasible for a non-technician, and conventional flashing techniques for devices peripheral to portable electronic devices require significant interaction by the user.

To flash the conventional peripheral device the user often must deliberately perform a number of steps that may be cumbersome and inconvenient. For example, in many cases the user must search for, select, and obtain a firmware update image and means to load the update image to the peripheral device. The user may also be required to manipulate both the peripheral device and the means for updating into an update configuration, cease other operation of the peripheral device during the update, etc. These requirements limit the user's mobility, consume the user's time and attention to download or select a firmware image to flash, deliberately connect/ configure the peripheral device and update means, and start the program to flash the firmware image.

Moreover, for any of several reasons a peripheral device conventionally cannot be operated during such update. For example, the existing firmware may be overwritten, thus necessitating that operation of the peripheral device cease prior to update. The process typically includes many risks, and can result in rendering the unsuccessfully flashed device permanently inoperable (commonly termed "bricked").

In some instances, a user may install software on their electronic device, which may be used to identify a firmware image hosted on a separate server, and permit the user to download and install a new firmware image. However, this method nevertheless requires the user to deliberately engage the software to check for and identify a different firmware image, elect whether or not to obtain the identified firmware image, and choose an appropriate moment for updating, which as noted above may render the peripheral device unusable for a period of time. Accordingly, users may be disinclined to update the firmware of their peripheral device despite benefits of such update.

Figure 2:
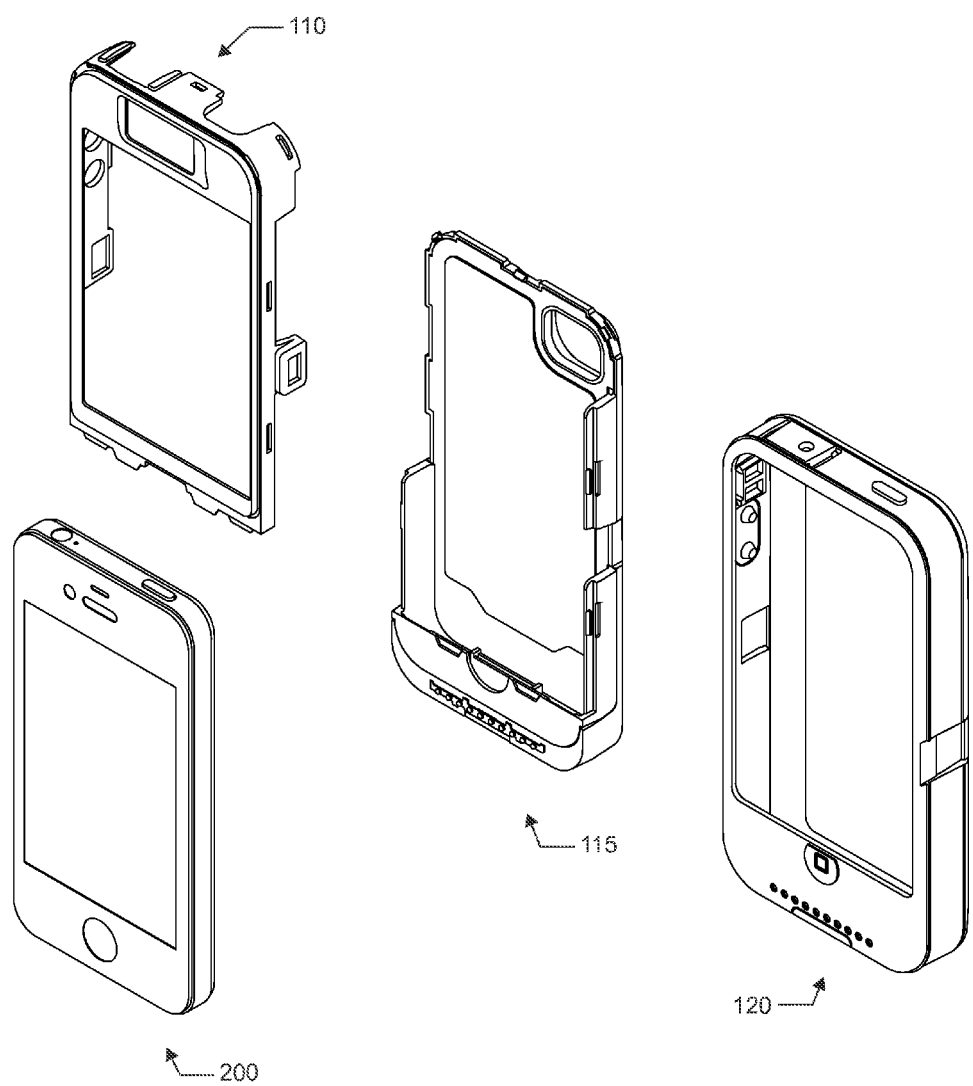
FIG. 2 shows a top-front perspective view of the disassembled protective case, as peripheral device for a portable electronic device, together with a portable electronic device.

This disclosure addresses shortcomings of the conventional updating methodology. FIGS. 1-5 illustrate, as an example of a peripheral device, a battery case 100 for a portable electronic device 200. Firmware of battery case 100 may be updated according to the present disclosure. In certain embodiments the battery case 100 may include a number of parts that can be assembled into a whole. FIG. 1 illustrates such a multi-part battery case 100 in an assembled state. As shown in FIG. 2's exploded top-front view, in non-limiting embodiments a battery case 100 may include multiple enclosure parts, including a front shell 110 and a back shell 115 which may be assembled to enclose a portable electronic device 200 such as a smartphone. A stretchable cushion layer 120 is configured to fit snugly over the assembled back and front shells. The battery case 100 is not limited to this configuration, however, and one of ordinary skill in the art will recognize that a battery case may come in many configurations including single piece, two-piece slider, cases having no stretchable cushion layer, no front shell, etc.

Figure 3:
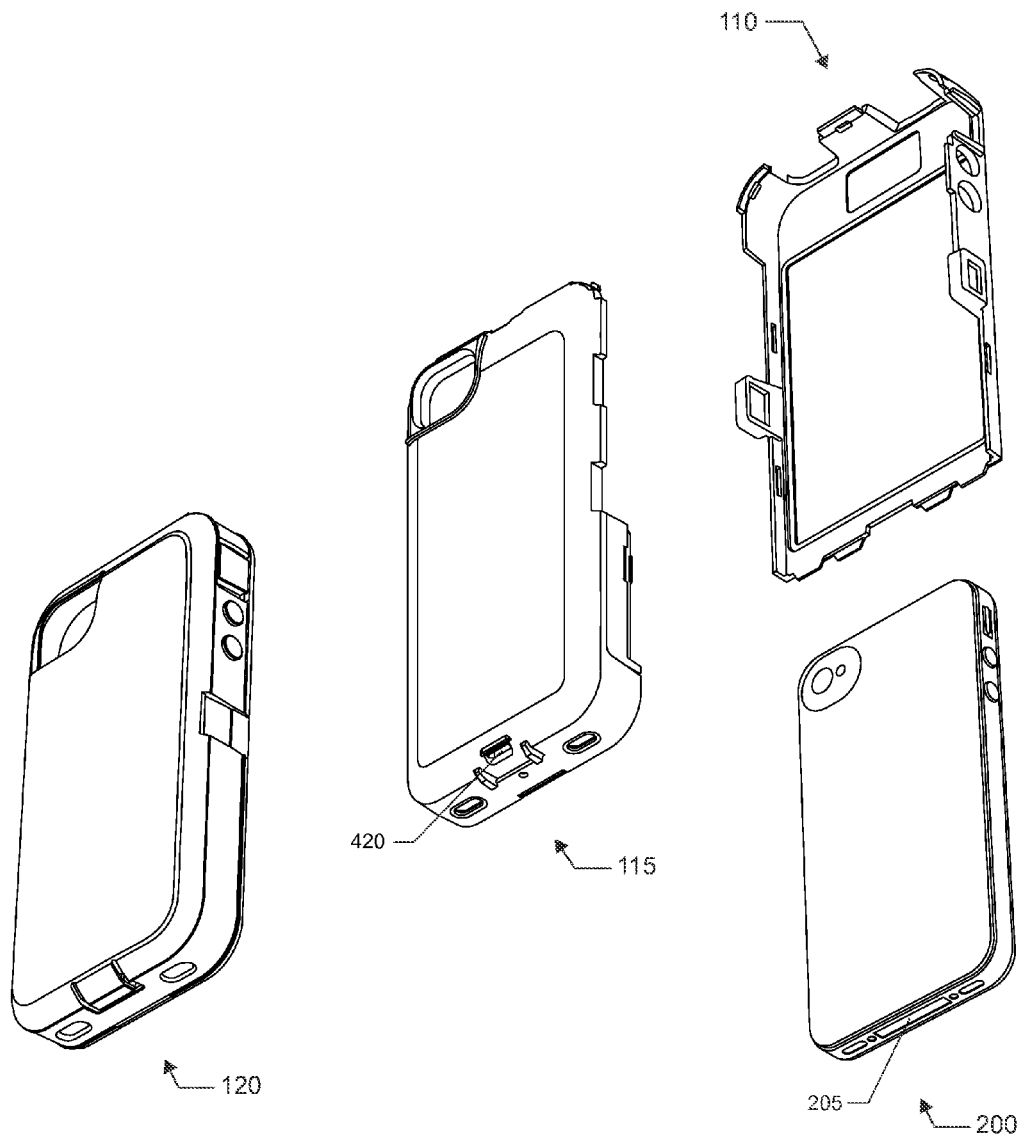
FIG. 3 shows a bottom-rear perspective view of the disassembled protective case, as peripheral device for a portable electronic device, together with a portable electronic device.

FIG. 3 provides a bottom-rear exploded view complementing FIG. 2. The back shell 115 exposes a case power connector 420 which is part of circuitry 400 (shown in FIGS. 4-5). Although shown at a bottom portion of the case, it will be appreciated that the case power connector 420 is not limited to this location. Moreover, the case power connector may be positioned to be sealed behind a dustproof, waterproof, and/ or water-resistant cover in some embodiments.

Also illustrated in FIG. 3 is a bottom portion of portable electronic device 200, which includes a device connector 205. As will become apparent, device connector 205 may be used to interface with circuitry of the battery case 100.

Figure 4:
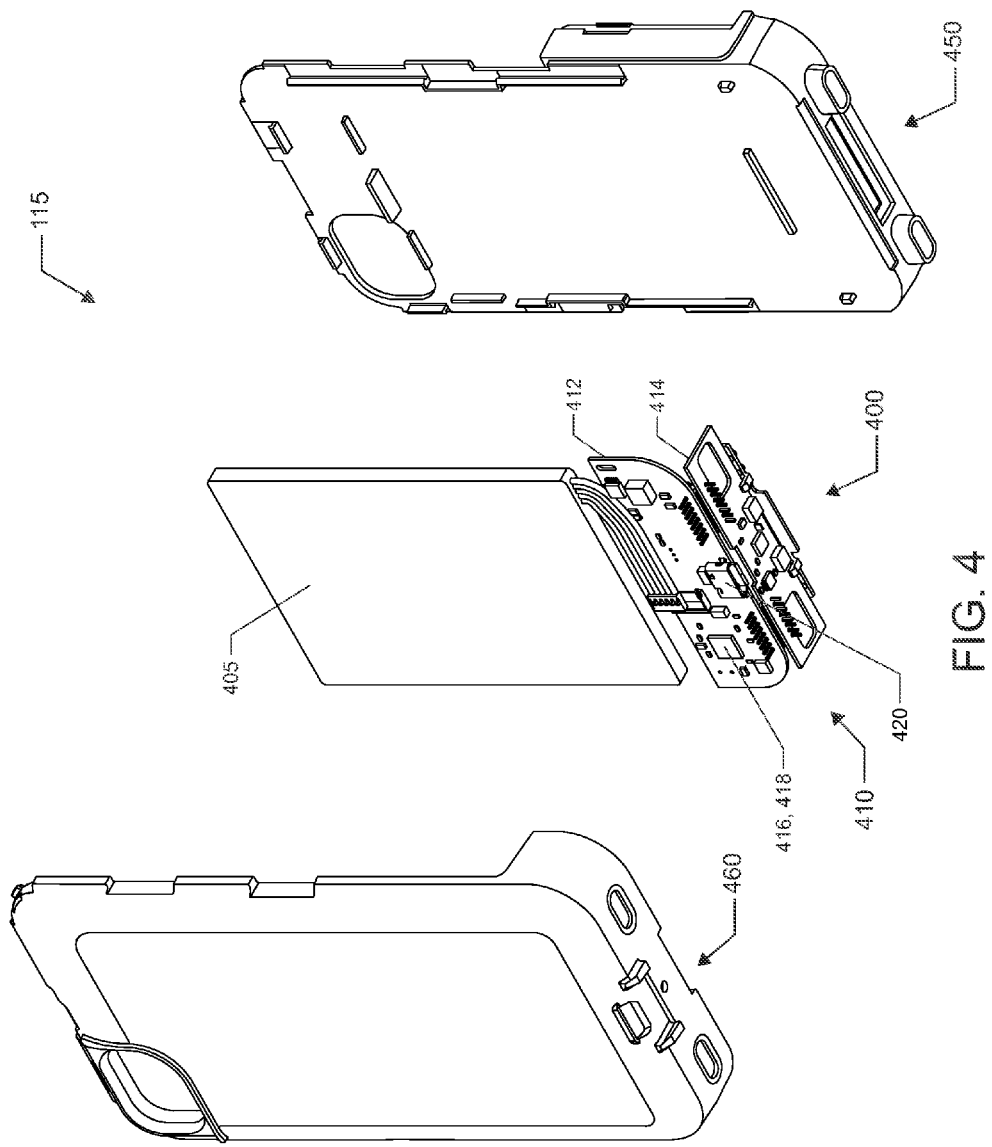
FIG. 4 shows a bottom-rear, partially-exploded perspective view of back shell portion of the protective case, as peripheral device for a portable electronic device.

FIG. 4 provides a bottom-rear exploded view of back shell 115 in one embodiment of a peripheral device, a battery case for a portable phone. In the battery case described above, back shell 115 may enclose circuitry 400 between an inner back shell portion 450 and an outer back shell portion 460, which can be sealed together to enclose the circuitry. Circuitry 400 may include a battery 405 electrically connected to a circuit board 410, which circuit board may, as illustrated, include multiple portions such as main circuit board 412 and/or interface circuit board 414. The circuit board includes a microprocessor or microcontroller 416 and non-volatile memory 418. In the figures, the microprocessor/microcontroller 416 and non-volatile memory 418 are integrated into a same IC package. However, in other configurations (not shown), the microprocessor/microcontroller 416 and non-volatile memory 418 may be provided separately. Non-volatile memory 418 may include read-only memory (ROM) such as electrically erasable programmable read-only memory (EEPROM), and/or other non-volatile memory such as flash memory.

Non-volatile memory 418 is, in disclosed embodiments, arranged to have a portion dedicated to firmware. That is, the memory portion is sized and configured to hold a firmware image that includes instructions for the operation of the peripheral device. As described below in further detail, the memory 418 may include multiple portions for alternative firmware images, and may be updated in response to commands and data from the portable electronic device 100.

The circuit board 410 may include the case power connector 420 which may, for example, be used to connect the battery case 100 to an external power supply and, in certain configurations, to a computer for data transfer through the case 100 to the portable electronic device 200. In some embodiments the case power connector 420 may use USB, LIGHTNING and/or other connectors or communication protocols to convey power and/or communication signals from a computer or other device.

Figure 5:
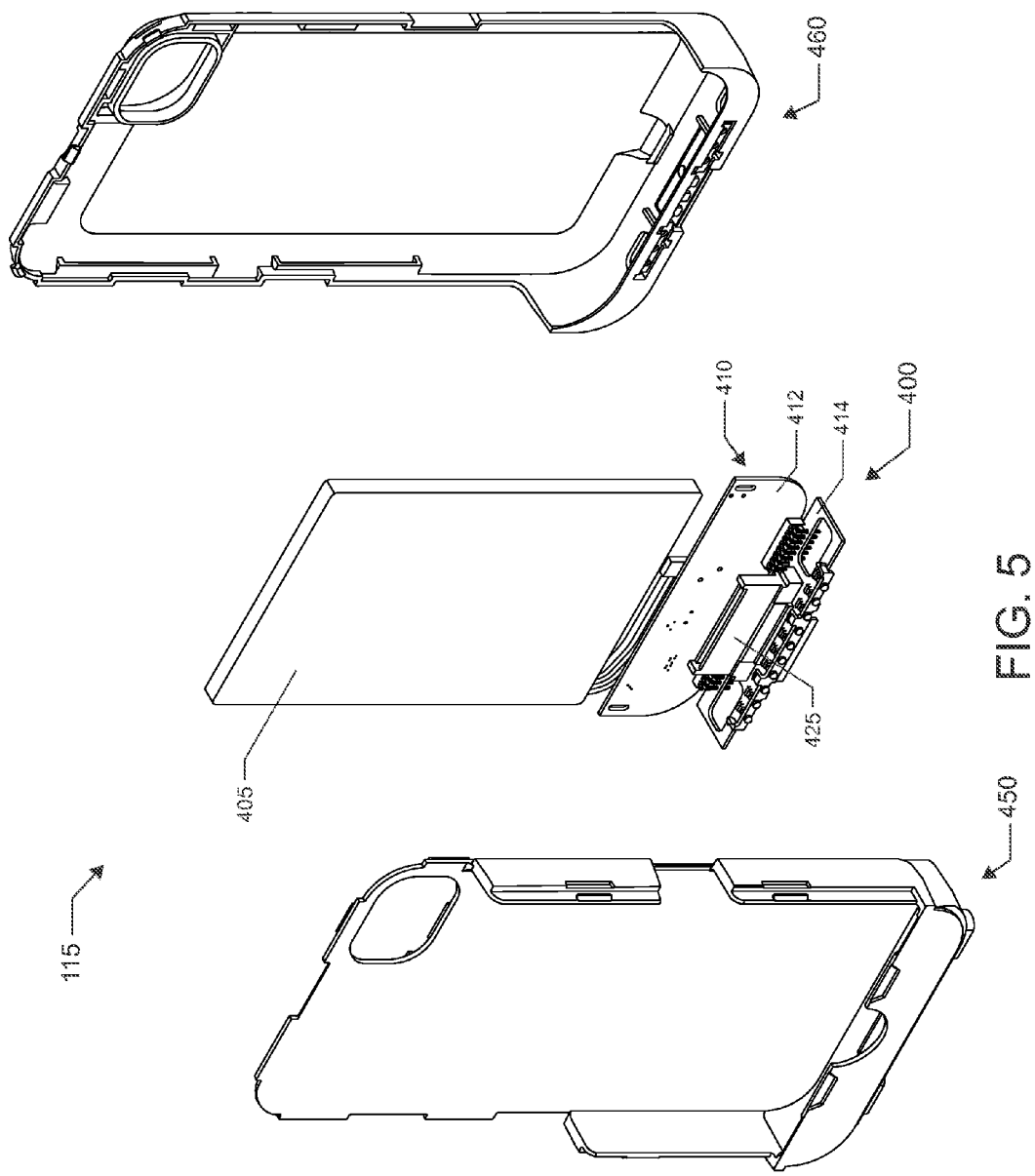
FIG. 5 shows a top-front, partially-exploded perspective view of back shell portion of the protective case, as peripheral device for a portable electronic device

FIG. 5 illustrates a top-front exploded view of back shell 115. The circuit board 410 may further include a case interface connector 425 for interfacing with device connector 205 of the portable electronic device 200. This interface will be discussed in further detail below. As will be appreciated by one of ordinary skill in the art, the circuitry 410 may include other well-known components that provide specific and/or complementary functionality, e.g., for communications or specific sensors, but which is not described in detail in the present disclosure.

FIGS. 1-5 should not be construed as limiting the size, shape, location or physical contours of a peripheral device, circuit board, or any parts thereof. One having ordinary skill in the art will appreciate that a circuit board, for example, may be modified and arranged to accommodate various constraints on the casing in which it resides. A battery case, for example, may be constructed to conform to physical constraints of a particular portable electronic device or class of portable electronic devices. It will be appreciated that the circuit board may be positioned at the top, bottom, or any other portion of the peripheral device, depending on space and/or design preferences and/or on the position of a connector on the corresponding portable electronic device(s). The circuit board 410 could, for example, be positioned in a central portion of a battery case 100, or an electrical connection may be made between the circuit board 410 and a case interface connector 425 positioned at a top end or side portion of a battery case 100 by way of a wire, cable, and/or flex circuit.

This disclosure provides a description in which firmware for a peripheral device, such as the battery case described above, may be updated. For such update, the peripheral device 100 and portable electronic device 200 are connected, where case interface connector 425 and device connector 205 are joined to accommodate electrical and data communication therethrough. The portable electronic device 200 may present commands such as firmware update commands, responses, and data such as firmware through device connector 205 and through case interface connector 425 for receipt by, e.g., microprocessor/microcontroller 416 or other appropriate communication circuitry. Likewise, microprocessor/microcontroller 416 may present commands, responses, and data through case interface connector 425, and through device connector 205 for processing by the portable electronic device 200. In certain configurations data and/or power received at case power connector 420 from an external source may be passed through directly to the portable electronic device 200. Likewise data from portable electronic device 200 directed to an external destination may be passed through the peripheral device 100 for use by the external destination.

As noted above, a peripheral device may include a microprocessor/microcontroller such as microprocessor/microcontroller 416 of FIG. 4, which typically executes instructions read from a non-volatile memory, such as memory 418. In brief, the present disclosure details a process in which a portable electronic device obtains an app that provides functions to be performed by the portable electronic device, new (update) firmware and instructions for executing a firmware update using the updated firmware. When executed, the functions of the app performed by the portable electronic device typically include a function related to the peripheral device.

Figure 6:
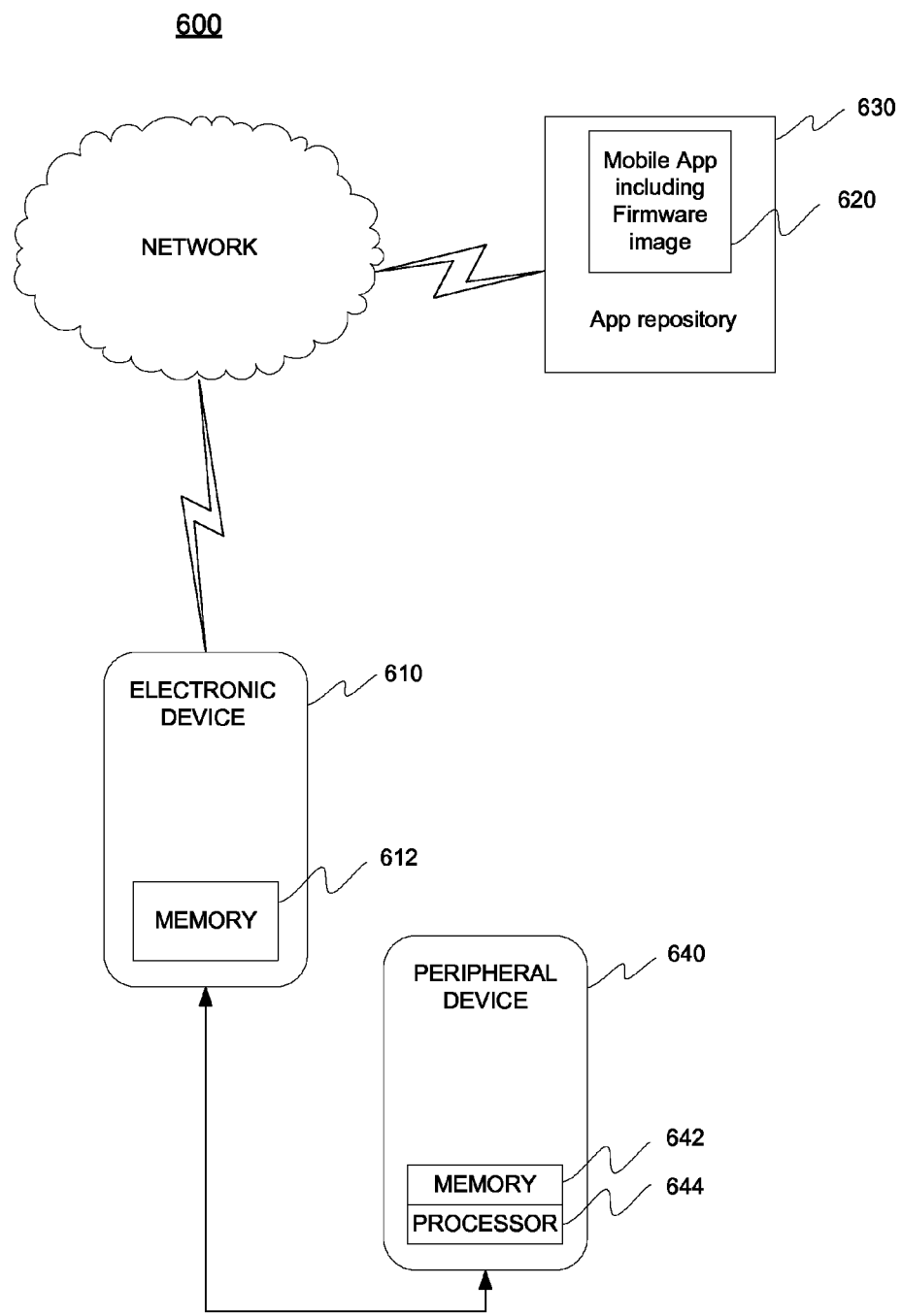
FIG. 6 illustrates system components for updating firmware in a peripheral device.

In one non-limiting example of a system 600 for updating firmware of a peripheral device, illustrated in FIG. 6, an electronic device 610 (corresponding to portable electronic device 200 of FIGS. 2, 3) obtains, via a physical (e.g., wired) or wireless connection to a carrier network or business network, an app 620 from a remote app repository 630. The electronic device 610 may store the app 620 in a memory 612 (corresponding to memory 418 of FIG. 4) for execution. An updated firmware image included in the app is transferred to peripheral device 640, which under conditions described below stores the firmware in memory 642 and causes execution of the newly stored firmware by processor 644.

Figure 9:
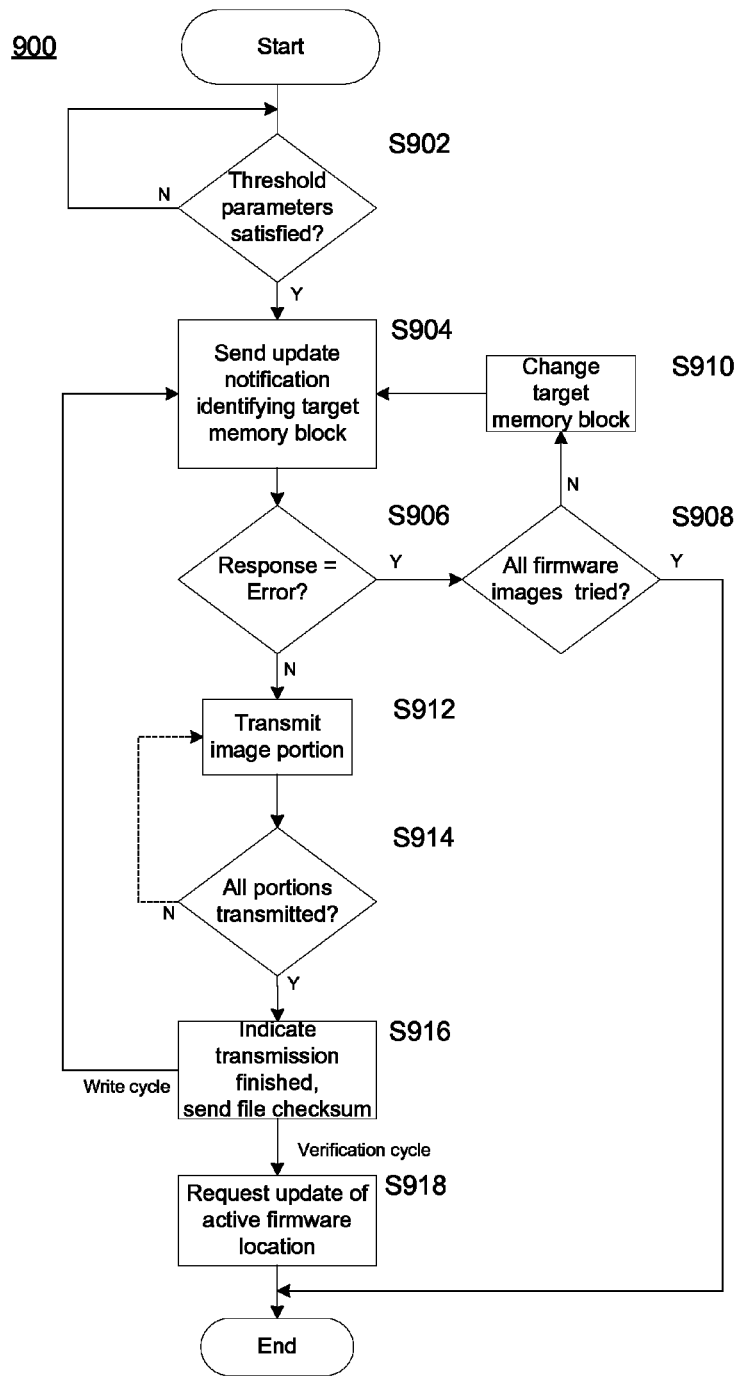
FIG. 9 is a flow chart for a firmware update process portion of a mobile app for execution by a portable electronic device.

The app 620 may include, as illustrated in FIG. 7A, primary instructions 710, secondary instructions 720, a first updated firmware image A, 730, and in certain embodiments at least a second updated firmware image B, 740. The primary instructions 710 provide features executed by the portable electronic device 610, for example the display and monitoring of battery charge levels in a battery of the electronic device 610 and/or of the peripheral device 640. The secondary instructions 720, being configured for communication with and data transfer to the peripheral device, require a physical (or at least logical) connection with the peripheral device 640, and when successfully executed cause one of the firmware images 730, 740 to be loaded to peripheral device 640 to be executed by peripheral device 640 instead of firmware previously executed by peripheral device 640. Embodiments of this firmware update process are illustrated in FIGS. 9-11 described below.

As shown in FIG. 7B, the firmware image 730 (and 740) may be formed from several firmware image portions 732, each firmware image portion 732 including at least a header 734, firmware image data 736, and a checksum 738. The header 734 may include information identifying a location for the firmware image portion 732 to be written in memory 418. The checksum 738 may be pre-calculated from the header 734 and firmware image data 736 or from only the firmware image data 736.

Returning to FIG. 6, app repository 630 may be a commercial app repository, such as the APPLE "APP STORE", "GOOGLE PLAY", and/or other well-established app repositories. Alternatively, the app may be obtained from a private repository or "side-loaded" to the portable electronic device 610, e.g., via a removable storage medium (not shown).

When executed by a processor (not shown) of the portable electronic device 610, the primary instructions 710 of app 620 may cause the portable electronic device 610 to perform functions related to the peripheral device 640. For example, in an embodiment in which the peripheral device is a battery case (such as battery case 100 described above), the app 620 may perform functions related to the features of the battery case, such displaying a charge level of a battery located in the portable electronic device and/or the peripheral device. Depending on circumstances, the app 620 may function in cooperation with data communicated from the peripheral device 640, or may function independently. For example, in an embodiment in which peripheral device 640 is a battery case, the app 620 may, even when not in communication with the battery case, display charge level of a battery in the portable electronic device 610, or display charge history data. However, when in communication with the peripheral device 640, the app 620 may display data received from the peripheral device 640, such as charge level of a battery in a battery case, times for charging the portable electronic device battery, etc., and may provide data to the battery case.

The secondary instructions 720 of app 620 may, when executed by the portable electronic device 610, cause a firmware image update in the peripheral device 640. In a disclosed embodiment memory 642 includes at least two memory blocks that can hold firmware images. In FIG. 8 is illustrated a memory layout showing a "high" memory block 805 and a "low" memory block 810, each of which is of sufficient dimension to hold a firmware image for the peripheral device 640. Here, "high" and "low" may refer to relative locations or address numbers in the memory 642 or to relative locations in common memory diagrams (e.g., FIG. 8). In disclosed embodiments each memory block is a continuous portion of memory 642, of a same size and mutually exclusive of other memory blocks. It is considered that the memory blocks alternatively may be configured as discontinuous portions of memory 642, with jumps to address the discontinuities being coded into the firmware.

Although the following description generally accounts for two memory blocks, one of ordinary skill in the art will appreciate that the disclosure may extend to more than two memory blocks. In addition, a boot section 815 of the memory 642 may include a designation of which of the memory blocks 805 or 810 should be executed. The peripheral device 640 uses only one firmware image a time. Thus, at a given time a firmware image may be executed from a "high" memory block designated for execution while an updated firmware image may be loaded into the "low" memory block (or vice versa).

Each of the updated firmware images 730, 740 may include identical instructions for the peripheral device, but be targeted for a different memory block. For example, firmware image A (730) may be targeted to the high memory block 805, whereas firmware image B (740) may be targeted to the low memory block 810.

One of ordinary skill in the art will recognize that more than two memory blocks may be used, and the app may thus include more than two updated firmware images. In embodiments having more than two memory blocks, the app 620 may include a set of firmware image corresponding to each of the more than two memory blocks. It will also be recognized that the app 620 may include a second set of updated firmware images that provide instructions that are different from instructions provided in the first set of updated firmware images for the peripheral device.

For example, in some embodiments, peripheral device 640 may include hardware capable of disparate functions. One memory block of peripheral device 640 may store firmware which causes the peripheral device to perform as a card reader, while another memory block may include firmware which can cause the peripheral device to perform as a bar code scanner. In peripheral devices such as this having multiple "personalities", the app 620 may include alternative (or cooperative) primary instructions 710 according to current peripheral device personality, and can cause the peripheral device 640 to load a corresponding firmware image from a memory block. Alternatively, different firmware image sets may be provided in the app to include various levels of functionality. For example, one firmware image might enable a full set of features, while another firmware image may enable only a partial set of the features.

FIGS. 9-10 present flow charts to illustrate a firmware update process as found in the secondary instructions 720 and within each firmware image 730, 740. The flow chart of FIG. 9 presents a method for an electronic device such as electronic device 610 or portable electronic device 100 (referred to in the description of FIG. 9 below simply as "electronic device". The flow chart of FIG. 10 presents a method for a peripheral device being updated, such as peripheral device 640 or battery case 200 (referred to below simply as "peripheral device").

In FIG. 9, the method of flow chart 900 begins with the electronic device checking whether threshold parameters are satisfied S902. Such parameters may include a determination that a peripheral device is connected to and in communication with the portable electronic device, determination of whether or not a limiting function is operating, whether the update has already been performed or the firmware is not different from that currently executed by the peripheral device, etc. In the instance that the peripheral device is a battery case 100 as discussed above, a threshold parameter may include a requirement of a predetermined minimum charge level for the battery in the peripheral device and/or in the portable electronic device in order to proceed. If a parameter is not satisfied, the update process may wait for a later opportunity ("N" at S902), or may abort. In another alternative, a user may be notified of the current and updated firmware versions and may select whether or not to proceed with a firmware update process. This alternative may enable the user to select updating with an older version of firmware or even to re-flash the same version of firmware.

If the parameters are satisfied ("Y" at S902), the electronic device transmits (S904) an update notification to the peripheral device indicating that a firmware update is forthcoming. The update notification may identify a specific memory block of a memory (such as memory 642 or memory 418), of the peripheral device. For example, the update notification may identify the "high" memory block as an intended destination for updated firmware. In S906, the electronic device receives a response to the update notification. The response may indicate availability of the memory block identified in the update notification, and the update process proceeds to S912.

If, instead, the peripheral device's response to the update notification indicates an error (i.e., the memory block identified in the update notification is not available) the electronic device may check to ensure availability, in the app, of an updated firmware image for another memory block (S908). If such firmware image is available, the electronic device identifies (S910) the differently-targeted firmware image in a new update notification (S904) to be sent. Alternatively, a response to the update notification may include information that identifies an available memory block, in which case the app may send a new update notification for a firmware image corresponding to the memory block that the peripheral device identified as available.

In another embodiment it may be appreciated that more than two updated firmware images may exist in an app (such as app 620), each respectively targeted for a mutually different memory block of the memory in the peripheral device, depending on the size of the firmware image and a size of the memory in the peripheral device.

Alternatively, in embodiments that utilize only two memory blocks, the portable electronic device 610 may, in response to the error, immediately proceed to transmitting the updated firmware image not identified in the update notification, without sending a new update notification or checking whether other updated firmware images are available.

In still another embodiment (not shown), an app may provide a single firmware image having memory block location information that can be dynamically changed while the firmware image is being sent to the peripheral device. For example, such changeable firmware image may include a default memory location such as location information identifying a "high" memory block, and can be changed to instead include location information identifying the "low" memory block during loading, depending on memory block availability.

In another alternative embodiment, the update notification may include a first updated firmware image portion, which may be written to a corresponding memory portion in the peripheral device and/or verified, followed by receipt of a next updated firmware image portion, thus skipping one operation in the loading of the updated firmware image.

Upon receiving acknowledgement of an available memory block, the electronic device transmits (S912) the corresponding updated firmware image to the peripheral device. Once all portions of the firmware image are transmitted (S914), the portable electronic device notifies (S916) the peripheral device that the transmission is finished, and provides (S916) to the peripheral device a pre-calculated file checksum of the transmitted firmware image file, which the peripheral device compares against a total checksum calculated at the peripheral device.

Certain of the method instructions may be repeated for further verification of the firmware image. Thus, a first pass through the instructions is, in the figures, referenced as a "Write cycle" (because the firmware image is written to memory), and the second pass through method instructions is here referenced as a "Verification cycle" (because the firmware image is verified without being rewritten). If, in the above-described checksum comparison, the pre-calculated checksum matches the total checksum calculated in the peripheral device (i.e., the "Write cycle" branch at S916), the process may repeat, thus starting the "Verification cycle". For example, the electronic device may again send an update notification and transmit the corresponding updated firmware image.

After the verification process is satisfied, i.e., the updated firmware is successfully transmitted and the file checksum is verified again ("Verification cycle", at S916), the electronic device sends a command that causes the peripheral device to update the location from which it executes firmware (S918). This may cause the peripheral device to reset.

In an exemplary embodiment the firmware image is transmitted portion by portion, each portion including a target memory block address, firmware data, and a predetermined portion checksum as described above for FIG. 7B. Thus, at S914, the process returns ("N" see dotted line) to S912 for transmission of a next portion until all portions are transmitted.

If at any stage of the update process an error occurs, the update process may abort.

Figure 10A:
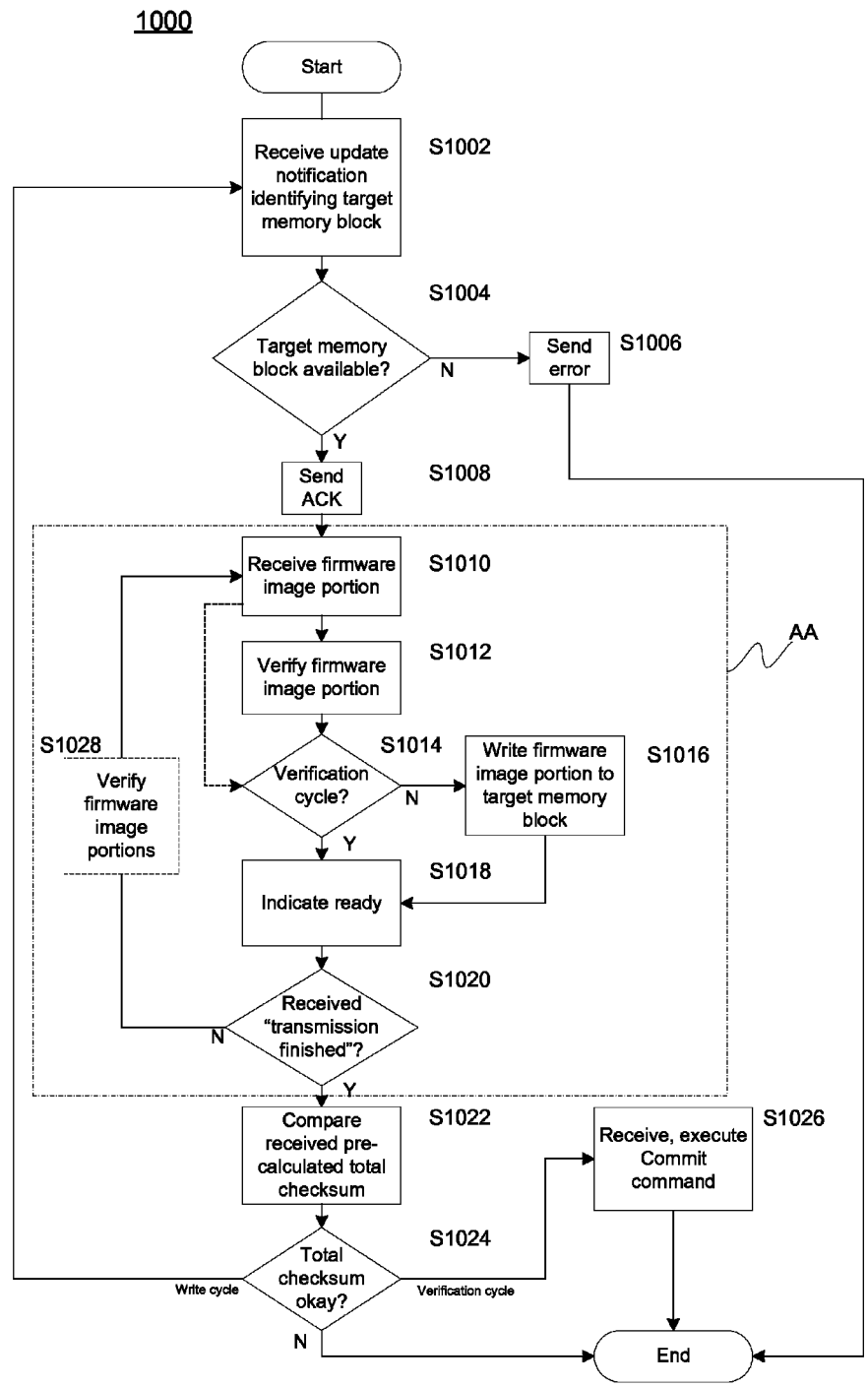
FIGS. 10A and 10B provide flow charts for peripheral device instructions for updating firmware in the peripheral device.

In FIG. 10A, flow chart 1000 illustrates a method performed by a peripheral device in a firmware update process. At S1002, the peripheral device receives an update notification from an electronic device. The update notification identifies a target memory block of the peripheral device. The peripheral device determines whether the targeted memory block is available (S1004). For example, the identified target memory block may be compared with a code vector that designates a memory block in a vector table, or, in another embodiment, compared with a register value identifying a memory block for execution. If the identified target memory block is not available ("N" at S1004; e.g., the target memory block is already designated as an active memory block), an error is transmitted (S1006) to the electronic device. In certain embodiments, the peripheral device may, with the error, or as error information, specifically identify an available memory block. If, however, the target memory block is available, an acknowledgment (ACK) so indicating is sent (S1008) to the electronic device. The peripheral device then expects to receive a firmware image portion destined for the targeted memory block.

Figure 10B:
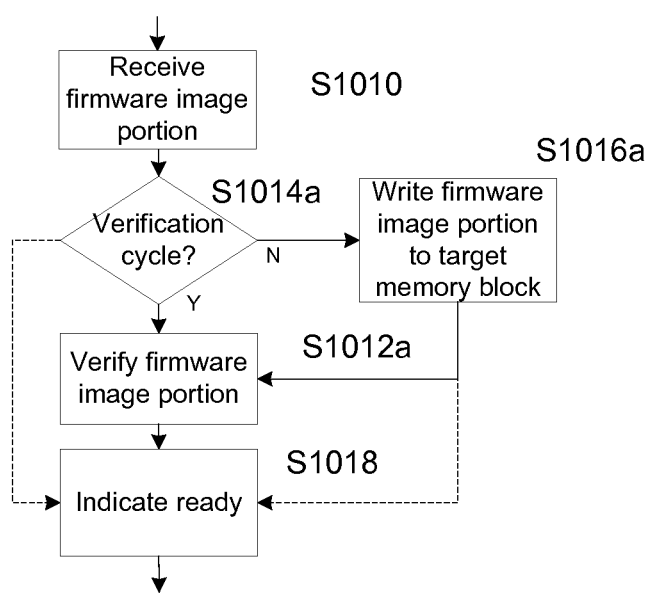

At S1010-S1016 of FIG. 10A, the peripheral device receives the updated firmware image portion, verifies it and, depending on whether the firmware update process is not in a Verification cycle ("N" at S1014), may write the update image portion to the identified target memory block. FIG. 10B shows an alternative (AA) for S1010 to S1018, where writing and verifying the updated firmware image portion may be interchanged as shown at S1012a to S1016a.

Verification, in S1012 (or S1012a), involves calculating a checksum for the portion and comparing the calculated checksum against a pre-calculated checksum received from the portable electronic device. The pre-calculated checksum may be included in the firmware image portion or provided in a separate transmission from the portable electronic device, and is not included in the checksum calculation. In FIG. 10A, if the calculated portion checksum matches the pre-calculated portion checksum (S1012) during a write cycle ("N" at S1014), the updated firmware image portion is written (S1016) to the target memory block. In FIG. 10B, during a write cycle ("N" at S1014a) an updated firmware portion is written to the target memory block in S1016a, followed by verification at S1012a.

In addition, the peripheral device may use the calculated portion checksum in updating (not shown) a running total checksum for the entire updated firmware image.

In disclosed embodiments each firmware image portion is verified, either before (S1012, FIG. 10B) or after (S1012a, FIG. 10B) it is written to the memory block. However, in alternative embodiments, the process may proceed directly from receipt of a firmware image portion to verification thereof (see dotted arrows in FIGS. 10A, 10B), where verification of each updated firmware portion may be skipped, or postponed (S1028) until all firmware image portions have been written, e.g., by calculating and sending a checksum to the portable electronic device for comparison by the app, or by reading back each firmware portion to the portable electronic device for comparison by the app.

Specifically, the peripheral device may calculate a checksum for the received firmware image portion and for a corresponding updated firmware portion in the memory block, and compare the two checksums. Alternatively, the peripheral device may conduct a bit-by-bit or byte-by-byte comparison of the received portion and the previously written portion.

In certain disclosed embodiments, the firmware update process may be repeated solely for verification. In this case, each firmware image portion is written to the memory block only on the first pass ("Write cycle"). Thus, at S1014 (S1014a), the peripheral device tracks whether the firmware image portion is being received as part of a Write cycle or as part of a Verification cycle. If Write cycle ("N" at S1014, 51014a), and verification is satisfactory, the updated firmware image portion is written (S1016, 51016a) to the identified memory block. Once the firmware image portion is written to the memory block, the peripheral device may send (S1018) a notification of readiness for another image portion or other data. If a "transmission finished" signal is not received ("N" at S1020), the peripheral device continues to receive, verify, and write (or receive, write and verify) successive updated firmware image portions. Alternatively, checking for the "transmission received" signal may take place prior to, or simultaneous with checking for receipt of an updated firmware image portion.

The process repeats from receiving an updated firmware image portion (S1010) until the "transmission finished" signal is received (S1020) from the portable electronic device. One of ordinary skill in the art will recognize that the term "transmission finished" here may represent any of a number of signals indicating that all portions of the updated firmware image have been transmitted.

Along with a "transmission finished" signal, the peripheral device may receive a pre-calculated total checksum from the portable electronic device. The peripheral device may compare (S1022) the pre-calculated checksum against the running total checksum. If not satisfactory ("N" at S1024), the process ends. Otherwise, the peripheral device acknowledges the match to the portable electronic device. If the just finished pass through the instructions was a "Write cycle" (at S1024), the process repeats from receiving an update notification (S1002). Otherwise (i.e., "Verification cycle" at S1024), the peripheral device may then receive and execute a "commit" command (S1026), which causes the peripheral device to revise information indicating which memory block to execute upon a reset of the peripheral device, and resets in order to execute the updated firmware.

Figure 11A:
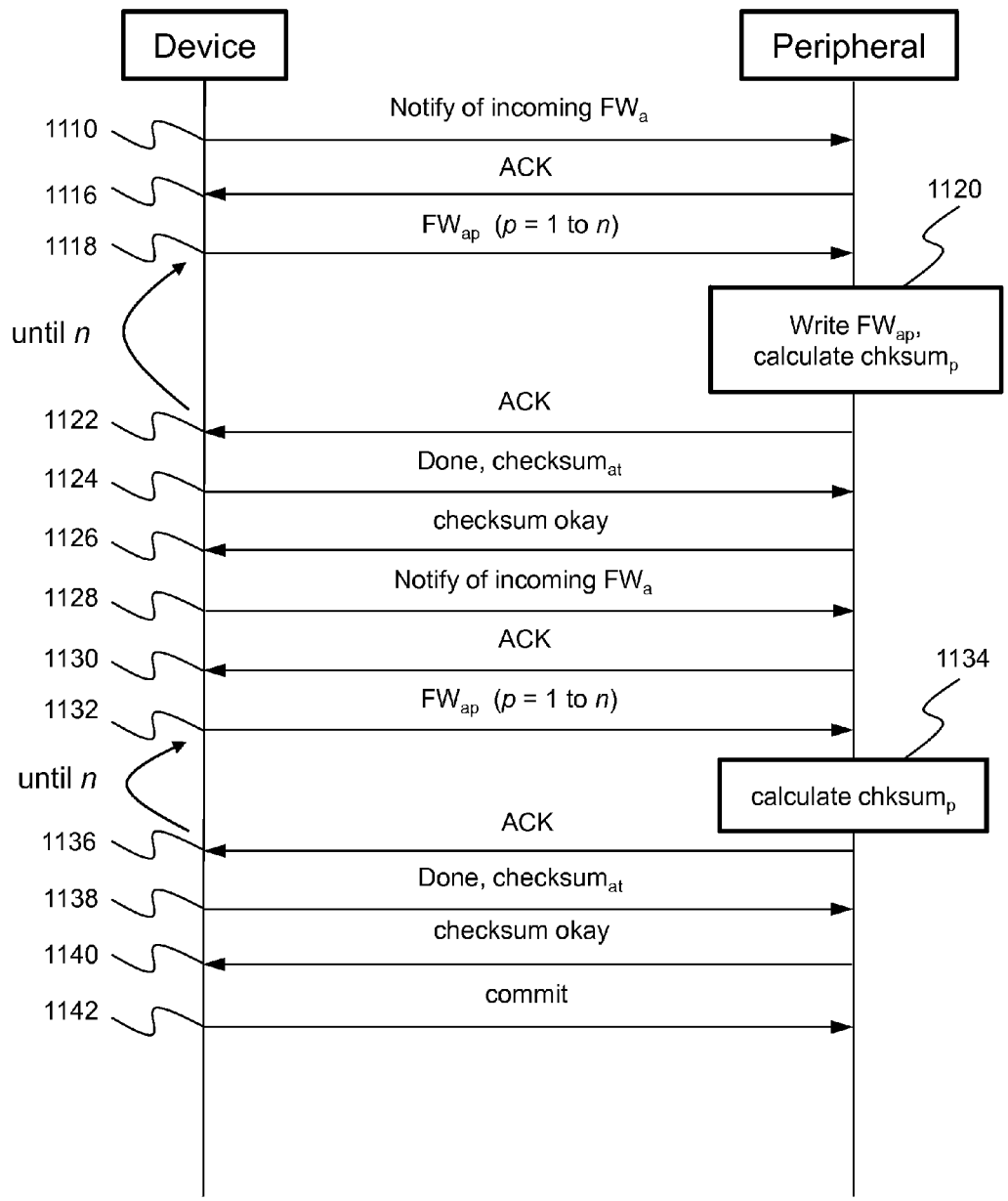
FIGS. 11A and 11B are communication diagrams illustrating communication between a portable electronic device and peripheral device during a firmware update, according to disclosed embodiments.
Figure 11B:
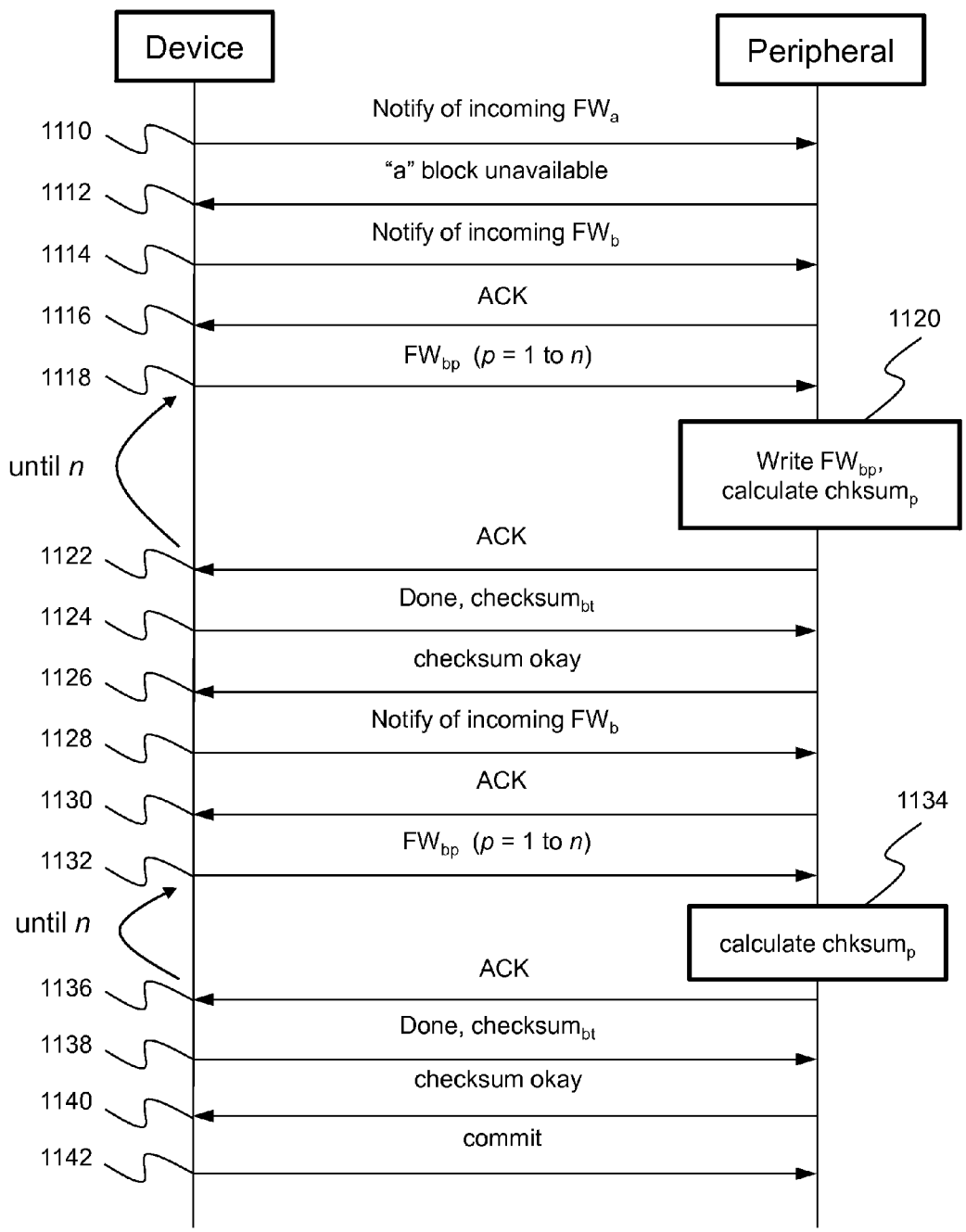

The above process will be presented now with reference to FIGS. 11A and 11B, which illustrate a communication between a portable electronic device such as electronic device 200 or 610 ("Device") and a peripheral device such as peripheral device 100 or 640 ("Peripheral"). FIG. 11A illustrates communications when the first update notification identifies an available memory block of the Peripheral. FIG. 11B illustrates communications when the first update notification identifies a memory block of the Peripheral that is not available.

At 1110, the Device sends notification of imminent transmission of an updated firmware image corresponding to a first memory block of the Peripheral, here designated $FW_a$, where "a" identifies the memory block. The Peripheral responds 1116, here indicating availability of memory block "a". The Device successively transmits portions $FW_{ap}$ of the updated firmware image $FW_a$, where p is in the range 1 to n, n being the number of updated firmware image portions. For each firmware portion $FW_{ap}$ the Peripheral calculates the portion checksum ($chksum_p$ at 1120) and verifies the firmware portion $FW_{ap}$ using the calculated checksum, as described above with respect to FIG. 10A, updates a running total checksum using the image portion checksum, and writes the updated firmware portion $FW_{ap}$ to memory block "a". As noted above, the writing and verification may be performed in any order.

The Peripheral acknowledges successful processing at 1122. After the final portion, $FW_{an}$, is transmitted, processed, and acknowledged, the Device sends an indication 1124 of "transmission finished" ("Done", in FIG. 11) and sends a pre-calculated total checksum corresponding to $FW_a$ ("$checksum_{at}$"). The Peripheral compares $checksum_{at}$ with the running total checksum and indicates a match ("checksum okay") 1126. If verification of each updated firmware image portion checksum or of the firmware image file checksum fails (not illustrated), an error is reported to the Device.

For the verification cycle, the updated firmware image $FW_a$ is again transmitted as portions $FW_{ap}$. This may begin with a second update notification 1128, followed by acknowledgement 1130 from the Peripheral and successive transmission 1132, verification 1134, and acknowledgement 1136 of each $FW_{ap}$. The transmission complete ("Done") and pre-calculated total $checksum_{at}$ may be transmitted 1138 again, verified, and confirmed 1140. The Device sends a "commit" command 1142, thus causing the Peripheral to revise a designator indicating which memory block from which to execute firmware on next reset/power-up. Restarting may proceed automatically, or in certain embodiments may depend upon satisfaction of predefined parameters. For example, in certain situations it may be prudent to delay restarting of the Peripheral until, for example, a task is finished, environmental conditions are satisfactory, or the Peripheral or Device is (or is not) in a particular state. In certain embodiments, a vector table of the peripheral device memory indicates which memory portion is to be executed (i.e., the location of "active" firmware). This vector table is rewritten in such embodiments to identify the memory location of the just-written firmware, and then a watchdog timer is caused to expire, thus triggering a reset of the peripheral device.

FIG. 11B shows the communication between the Device and the Peripheral in a case that the first-identified memory block is not available (e.g., is currently in use). The communication is basically the same as in 11A, with the exception that at 1112 the Peripheral indicates to the Device that the "a" block is not available. As a result, the Device sends a new update notification (1114), this time identifying an updated firmware image $FW_b$ corresponding to a different memory block "b" of the Peripheral. The remainder of the communication proceeds as in FIG. 11A, using memory block "b" and corresponding pre-calculated total $checksum_{bt}$, etc. instead of using memory block "a" and corresponding pre-calculated total $checksum_{at}$, etc.

In review of the above disclosure, a peripheral device for an electronic device has a memory with at least two memory blocks each configured to store a respective set of instructions, one of the memory blocks being changeably designated as an active memory block. Electrical circuitry of the peripheral device is configured to receive an update notification from the electronic device, the update notification identifying one of the at least two memory blocks for receiving updated instructions. Upon determination that the identified one memory block is not the active memory block, the circuitry transmits a response to the electronic device acknowledging the update notification, receives, from the electronic device, the updated instructions targeted for the identified memory block, and writes the received updated instructions to the identified one memory block.

In contrast, upon determination that the identified one memory block is the active memory block, the electronic circuitry transmits a response to the electronic device indicating an error, receives another update notification from the electronic device that identifies a different one of the at least two memory blocks for receiving the updated instructions, and receives, from the electronic device, the updated instructions targeted for the identified different memory block, and writes the received updated instructions to the identified different memory block. The electronic circuitry then designates the memory block to which the received updated instructions were written as the active memory block in response to a command from the electronic device.'

In certain embodiments, the electrical circuitry is further configured to verify the received updated instructions, wherein the verification includes calculation of a portion checksum respectively for each of one or more updated instructions portions constituting the received updated instructions, comparison of the calculated portion checksum against a provided portion checksum included in said each updated instructions portion, and notification to the electronic device that the calculated portion checksum matches the provided portion checksum.

If the number of updated instructions portion is more than one, the electrical circuitry may be further configured to, for said each received updated instructions portion, successively update a running total checksum using the calculated updated instruction portion checksum, and upon receiving from the electronic device a pre-calculated total checksum and information that indicates all updated instructions portions have been received, compare the pre-calculated total checksum against the running total checksum.

The electrical circuitry may be further configured to acknowledge to the electronic device that the received updated instructions were successfully written and verified, to receive another update notification identifying the memory block that was written, and to successively receive the updated instructions portions again for re-verification.

The electrical circuitry of the peripheral device may be further configured to be reset so that the updated instructions will be executed.

The peripheral device having the memory and electrical circuitry may be a protective enclosure that includes a battery configured to power the electronic device and to recharge a battery of the electronic device, based on the instructions in the active memory block.

The received updated instructions and the instructions in the active memory block may respectively comprise firmware which when executed in the electrical circuitry manages at least charging and discharging of the battery of the protective enclosure and of the battery of the electronic device.

The electronic device may be a mobile telephone configured to acquire from a remote source a software application ("app") that includes first instructions, second instructions, and one or more sets of updated instructions. The first instructions, when executed by the mobile telephone, may cause results of functions in the peripheral device to be displayed on a display of the electronic device. The second instructions, when executed by the mobile telephone, may cause the peripheral device to receive, store, and execute an updated instructions set transmitted from the mobile telephone. The one or more sets of updated instructions may include firmware. If two or more updated instructions sets are included in the app, each updated instructions set respectively may include information identifying a different one of the at least two memory blocks.

In addition, the peripheral device may also include an interface to a battery of the peripheral device, an interface to receive electrical power from an external power source, and a bar code reader and/or a magnetic strip reader configured to read information from a magnetic strip card. In such embodiment, the updated instructions and the instructions in the active memory block constitute respective firmware images, which firmware images when executed by the electrical circuitry may perform management of charging and discharging of the battery of the peripheral device with respect to a battery of the electronic device, and operation of the bar-code reader and/or the magnetic strip reader.

A method in the electronic device for updating firmware of the peripheral device may include acquiring an app that includes instructions to be executed by the electronic device and one or more updated firmware images for the peripheral device. The instructions for execution by the electronic device may include first instructions which when executed cause the electronic device to display information related to functions of the peripheral device. The instructions for execution by the electronic device may include second instructions for updating firmware of the peripheral device.

The second instructions include, upon determining that a version of the one or more updated firmware images is different from a version of a firmware image in the peripheral device, transmitting successive portions of one updated firmware image, from the one or more updated firmware images, the one updated firmware image being targeted for storage in a memory block, of the peripheral device, that is different from a memory block used by the peripheral device for currently active firmware. For each updated firmware image portion successfully transmitted, the electronic device can receive, as a condition for transmitting a next updated firmware image portion, an acknowledgment from the peripheral device that the updated firmware image portion was received by the peripheral device. When all updated firmware image portions have been transmitted, the electronic device transmits to the peripheral device an indication of firmware image transmission completion.

The peripheral device may be a protective enclosure having a battery and electrical circuitry, and the information displayed may include information regarding the battery of the protective enclosure, said information derived from data communicated from the protective enclosure.

Before the transmitting of successive updated firmware image portions, the electronic device may transmit an update notification to the peripheral device, the update notification including information identifying one of the memory blocks, and may receive a response to the update notification.

Upon determining that the response to the update notification indicates an error, the electronic device may transmit a different update notification including information identifying the memory block that is different from the memory block used by the peripheral device for currently active firmware. The electronic device may receive acknowledgement from the peripheral device indicating that the transmitting of successive updated firmware image portions may proceed.

At least two updated firmware images may be provided in the app, each of the at least two updated firmware images being associated with a respective one of the memory blocks of the peripheral device, and the updated firmware image portions in the respective at least two updated firmware images including information identifying the respective associated memory block. The updated firmware image portions that are transmitted correspond to the memory block identified in the update notification or correspond to the different memory block identified in the different update notification, depending on whether or not the response indicates the error.

In certain embodiments, only one updated firmware image is provided in the app, and, in accord with the response to the update notification, memory block target information in the updated firmware image portions is confirmed or changed to indicate an available one of the memory blocks of the peripheral device.

The indication of transmission completion may include a pre-calculated total checksum for the written updated firmware image for comparison against a running total checksum calculated at the peripheral device. Upon determining that the calculated running total checksum matches the predetermined total checksum value, the method performed by the electronic device causes the peripheral device to use the written updated firmware image as a new active firmware image.

Upon receiving a response to the transmission completion indication, the transmissions of the update notification and of each updated firmware image portion are repeated for re-verification by the peripheral device.

The acknowledgement, from the peripheral device, of receipt of said each transmitted updated firmware image portion may further indicate successful verification that a calculated checksum of the transmitted updated firmware image portion, calculated at the peripheral device, matches a predetermined checksum of the transmitted updated firmware image portion included in the transmitted updated firmware image portion.

The acknowledgement, from the peripheral device, of receipt of each transmitted updated firmware image portion may further indicate that the transmitted updated firmware image portion was successfully written to the memory block that is different from the memory block used by the peripheral device for currently active firmware.

A non-transient processor-readable medium may have stored thereon a software application, including electronic-device-executable display instructions, electronic-device-executable firmware update instructions, and one or more firmware update images.

The display instructions may be configured to cause display of images on a display of the electronic device, the displayed images being based on parameters related to a peripheral device for the electronic device. The firmware update instructions may be configured to update firmware of the peripheral device. The one or more updated firmware images may include instructions to be executed by the peripheral device, each updated firmware image including address information corresponding to a respective mutually-different block of memory of the peripheral device.

The firmware update instructions cause the electronic device to transmit to the peripheral device one of the updated firmware images that corresponds to a non-active memory block of the peripheral device. Upon successful transmission of the entire one of the updated firmware images, which is written to the memory block of the peripheral device corresponding to the address information of the updated firmware image, the electronic device is caused to transmit to the peripheral device (a) an indication that transmission of the updated firmware image is complete, and (b) a pre-determined file checksum of the successfully transmitted updated firmware image. The electronic device is further caused to receive from the peripheral device an indication of whether or not the predetermined file checksum is successfully verified. If the received indication indicates that the predetermined file checksum is verified, the electronic device is caused to notify the peripheral device that the updated firmware image will be retransmitted for verification with respect to the written updated firmware image.

Prior to the transmission of the updated firmware image that corresponds to the non-active memory block, the firmware update instructions may further cause the electronic device to transmit an update notification to the peripheral device, the update notification identifying a target memory block of the peripheral device. If the target memory block corresponds to an active memory block of the peripheral device, the firmware update instructions may cause the electronic device to receive, from the peripheral device, information indicating that the target memory block cannot be written, and transmit, to the peripheral device, an update notification that identifies a memory block different from the active memory block.

In an embodiment of the method in which the application includes only one updated firmware image, the address information of the only one updated firmware image may be changed in response to the notification from the peripheral device indicating that the target memory block cannot be written.

The transmitting of the one updated firmware image may include successive transmission of portions of the one updated firmware image, each portion including portion address information, firmware information and a pre-determined checksum of the updated firmware image portion.

The firmware update instructions may further cause the electronic device to receive an error indicator when a portion verification checksum calculated by the peripheral device for an updated firmware image portion fails to match the pre-determined checksum of that updated firmware image portion. Upon receiving the error indicator, the firmware update instructions may further cause the electronic device to restart the firmware update instructions to begin again the portion-by-portion transmission of the updated firmware image that corresponds to the non-active memory block of the peripheral device.

The firmware update instructions may further cause the electronic device to receive from the peripheral device an indication of a version of active firmware stored at the peripheral device. In response to a determination that the firmware version of the active firmware image is the same as a version of the updated firmware image, execution of the firmware update instructions is terminated.

The software application may include one or more alternate updated firmware images having address information that is the same as the address information in the one or more updated firmware images. The one or more alternate updated firmware images may include instructions which when executed by the peripheral device enable functionality of the peripheral device that is substantially different from functionality enabled by instructions of the one or more updated firmware images.

A method in an electronic device for updating firmware of a device peripheral to the electronic device via a software application (app) of the electronic device may include storing the app in a memory portion of the electronic device and executing update instructions for updating firmware of the peripheral device, included in the app. The app also includes one or more updated firmware images. The update instructions cause, in the electronic device, transmitting to the peripheral device an update notification identifying a peripheral device memory block for receiving an updated firmware image. Upon receiving a response from the peripheral device that indicates availability of the identified peripheral device memory block, the update instructions cause transmitting, to the peripheral device, one updated firmware image and information designating an address of the identified peripheral memory block to which the updated firmware image is to be written. The update instructions cause indicating to the peripheral device that transmission of the updated firmware image is complete, and transmitting of a commit command to the peripheral device.

Along with the indicating that the transmission of the updated firmware image is complete, The update instructions also cause providing to the peripheral device a pre-calculated total checksum of the full updated firmware image that was transmitted, and, prior to transmitting the commit command, upon receiving an indication from the peripheral device that the pre-calculated total checksum matches a peripheral-device calculated total checksum, repeating, for verification, the notification of impending firmware update, the transmitting of the updated firmware image, and the indicating that transmission is complete.

The app may include two alternative updated firmware images that include identical instructions for the peripheral device. The alternative updated firmware images respectively include information identifying different peripheral device memory blocks of two possible peripheral device memory blocks from which the identified peripheral device memory block is selected.

The transmission of the updated firmware image includes successive transmission of plural updated firmware image portions constituting the updated firmware image, each updated firmware image portion being transmitted in response to a signal from the peripheral device.

The electronic device may obtain the app from a remote app repository.

The app may further include first instructions which when executed by the electronic device cause information to be displayed on a display screen of the electronic device.

The update instructions may further cause, prior to transmitting the update notification, checking that prerequisites for firmware update are satisfied, the prerequisites including that an electrical connection exists between a communications connector of the electronic device and a communications connector of the peripheral device.

A method performed in a peripheral device for updating its firmware includes responding to an update notification from an electronic device, and receiving from the electronic device an updated firmware image, including information designating a memory block of the peripheral device for writing the updated firmware image. The method further includes writing the updated firmware image to the designated memory block upon determining that the memory block identified in the update notification is available for writing. Upon receipt of a commit command from the electronic device, the method includes designating for execution the memory block to which the received updated firmware image was written, and resetting the peripheral device in order to execute the updated firmware image at the memory block designated for execution.

The instructions may further include receiving, with the indication that the transmission of the updated firmware image is complete, a pre-calculated total checksum for the updated firmware image. Comparing the pre-calculated total checksum with a peripheral-device calculated total checksum prepares the peripheral device, upon determining a match of the pre-calculated total checksum and the peripheral-device calculated checksum, for transmitting a confirmation of the match.

The responding to the update notification may include indicating availability of the peripheral device memory block identified in the update notification.

The availability status of the peripheral device memory block identified in the update notification may be indicated as not available for receiving the updated firmware image when the identified peripheral device memory block is designated as an active memory block storing firmware for current execution.

The responding to the update notification may indicate an error when the identified peripheral device memory block is not available for receiving the updated firmware.

If the response to the update notification indicates the error, the electronic device transmits a secondary update notification that identifies a different peripheral device memory block for receiving the update.

The method in the peripheral device may further include verifying the received updated firmware image. This is done by affirmatively comparing a pre-calculated checksum included with the updated firmware image against a checksum calculated by the peripheral device after receipt of the updated firmware image.

The updated firmware image may be received by the peripheral device in successive updated firmware image portions, each updated firmware image portion being received, verified, and successfully written to the identified memory block by the peripheral device successfully prior to processing of a subsequent updated firmware image portion.

One of ordinary skill in the art will appreciate that functions performed by a peripheral device are limited primarily by the skill and imagination of its creator(s), and that firmware in each instance may be tailored specifically for those functions. For example, peripheral device functions may also include (as non-limiting examples) wired and/or wireless communications, image capture and/or image reproduction functions, monitoring of various signals, evaluation of inputs from sensors, energy and/or signal enhancement, operation and/or tuning of mechanical components, audio features, etc.

It will be recognized by those having ordinary skill in the art that the primary instructions 710 of app 620 need not be limited to battery-case oriented functions. The mobile app 620, and particularly the primary instructions 710, may relate to features of a different peripheral device or a plurality of different peripheral devices. For example, the primary instructions may relate to interaction with, operation of and/or monitoring of a mobile point of sale (POS) peripheral device (possibly in a tablet case form), and may communicate with and utilize data from POS-oriented features such as a payment card reader or bar-code scanner. In another alternative, the primary instructions 710 in an app of portable electronic device 200 may communicate with a non-case peripheral. That is, a portable electronic device 200, may execute primary instructions for control of wired or wireless communication, while firmware instructions in the same app may control firmware updating as disclosed above between the portable electronic device 200 and communication-capable circuitry of any device.

In yet another embodiment, a user may select a firmware version from a library of firmware versions provided in or accessible by the app 620. Specifically, some peripheral devices may be reconfigured, depending on which of several firmware images is active, to perform differently or to perform different functions. The inclusion of multiple firmware images may also permit selectable use of enhanced features of a device. Such features may be made accessible, for example, upon receipt of corresponding unlock codes at the app 620.

For example, a battery case such as described above may include basic charge features, or may alternatively, depending on active firmware version, include enhanced or customized features. Customized features may include changing the timing and amount of charging for highest battery life or highest available power based on user preferences or based on monitored usage of the portable electronic device. Such changes may work in conjunction with particular features of the primary instructions 710 of the app 620.

The firmware update process described above may be carried out automatically each time the portable electronic device or the app is started. Alternatively the firmware update process may be initiated only upon first execution of the app 620 after the app is obtained by the portable electronic device 200. In a still further embodiment, the firmware update process in the portable electronic device 200 may be executed in response to an input received from a user, for example a predetermined button press or selection of a soft key of the app 620 designated for such purpose. Still further, the firmware update process may commence when the app, in the course of its primary instructions 710 receives a firmware version report from battery case (or other subject peripheral device 100), which communication indicates that a version of the currently executed firmware image is different from a version of the firmware image provided in the app 620. Those of ordinary skill will appreciate that these alternatives may be combined or performed independently.

The firmware update process may count the number of errors or failed checksum comparisons and terminate the firmware update when a predetermined number of re-tries is reached. For example, in one embodiment the firmware update process may restart three times before terminating the process. The count may be reset upon a forced restart of the mobile application and/or a reboot of the portable electronic device. In other circumstances, the user may be notified to contact a customer support group to help troubleshoot the errors.

To prevent erroneous writing of the updated firmware image, each portion (e.g., byte) of the updated firmware image may be written and then compared to an expected value. The comparison may include calculation of a checksum for the firmware image portion and comparison of the calculated checksum against an expected value. In addition, when all of the replacement firmware has been written, a checksum may be calculated for the whole, and compared with an expected value. If any of these checks fails, an error is reported and the firmware update is terminated. In one example, a predetermined number of attempts may be made to repeat reception of a firmware image portion, verification and writing of the firmware image portion initially having a non-matching checksum.

In a variation (not shown), the app 620 may, instead of including the firmware in its own code, check for firmware updates at a firmware repository. The firmware repository may be separate from a repository that hosts the app itself. Upon detecting a firmware version different from the firmware currently active in the peripheral device, the app may automatically download the firmware and initiate a firmware update as described above. Alternatively, a device user may be notified of firmware updates or may be presented with a catalog of firmware versions available. The user may then select a desired firmware update for download and installation.

Embodiments described above may pertain to a battery case peripheral for an electronic device, such as that illustrated in FIGS. 1-5 and described above. However, as will be appreciated by one of ordinary skill in the art, the safe method of updating firmware described above may be applied to all manner of peripheral devices, insofar as the term "peripheral" may be understood to mean any device having circuitry capable of interacting with or being controlled by the electronic device. For example, an app may include firmware and instructions for updating a traditional computer peripheral (e.g., printer, monitor, media drive, television, docking station, etc.), but is not limited to update of such traditional peripherals. The inventors envision that the disclosed methods may be applied to safely update firmware in all manner of vehicles, appliances, HVAC units, power systems, lighting fixtures, audio equipment, industrial machines, CNC, etc. If the device has capacity for firmware updates and wired or wireless communication with an electronic device, the above-described methods may be applied to quickly and safely update the firmware.

What is claimed is:

1. A peripheral device for an electronic device, the peripheral device comprising: a memory having at least two memory blocks each configured to store a respective set of instructions, one of the memory blocks being changeably designated as an active memory block; and electrical circuitry configured to: receive an update notification from the electronic device, the update notification identifying one of the at least two memory blocks for receiving updated instructions; upon determination that the identified one memory block is not the active memory block: transmit a response to the electronic device acknowledging the update notification, receive, from the electronic device, the updated instructions targeted for the identified memory block, and write the received updated instructions to the identified one memory block; upon determination that the identified one memory block is the active memory block: transmit a response to the electronic device indicating an error, receive another update notification from the electronic device that identifies a different one of the at least two memory blocks for receiving the updated instructions, receive, from the electronic device, the updated instructions targeted for the identified different memory block, and write the received updated instructions to the identified different memory block; and designate the memory block to which the received updated instructions were written as the active memory block in response to a command from the electronic device; and a battery configured, based on the instructions in the active memory block, at least to provide power to a device other than the peripheral device.

2. The peripheral device according to claim 1, wherein the electrical circuitry is further configured to verify the received updated instructions, wherein the verification includes to: calculate a portion checksum respectively for each of one or more updated instructions portions constituting the received updated instructions; compare the calculated portion checksum against a provided portion checksum included in said each updated instructions portion; and notify the electronic device that the calculated portion checksum matches the provided portion checksum.

3. The peripheral device according to claim 2, wherein, if the number of updated instructions portion is more than one, the electrical circuitry is further configured to: for said each received updated instructions portion, successively update a running total checksum using the calculated updated instruction portion checksums; and upon receiving, from the electronic device, a pre-calculated total checksum and information that indicates all updated instructions portions have been received, compare the pre-calculated total checksum against the running total checksum.

4. The peripheral device according to claim 3, wherein the electrical circuitry is further configured to: acknowledge to the electronic device that the received updated instructions were successfully written and verified, receive another update notification identifying the memory block that was written, and successively receive the updated instructions portions again for re-verification.

5. The peripheral device according to claim 1, wherein the electrical circuitry is further configured to be reset so that the updated instructions will be executed.

6. The peripheral device according to claim 1, wherein the battery is further configured, based on the instructions in the active memory block, to power operation of the electronic device and to recharge a battery of the electronic device.

7. The peripheral device according to claim 6, wherein the received updated instructions and the instructions in the active memory block respectively comprise firmware which when executed manages at least charging and discharging of the battery of the protective enclosure and of the battery of the electronic device.

8. The peripheral device according to claim 1 wherein the electronic device is a mobile telephone configured to acquire, from a remote source, an app that includes: instructions which, when executed by the mobile telephone, cause results of functions of the peripheral device to be displayed on a display of the electronic device; instructions which, when executed by the mobile telephone, cause the peripheral device to receive the updated instructions from the mobile telephone; and one or more updated instructions sets, wherein if two or more updated instructions sets are included in the app, each updated instructions set respectively includes information identifying a different one of the at least two memory blocks.

9. The peripheral device according to claim 1, further comprising: an interface to the battery of the peripheral device; an interface to receive electrical power from an external power source; and at least one of: a bar code reader, and a magnetic strip reader configured to read information from a magnetic strip card, wherein the updated instructions and the instructions in the active memory block constitute respective firmware images, which firmware images when executed by the electrical circuitry perform: management of charging and discharging of the battery of the peripheral device with respect to a battery of the electronic device, and operation of at least one of the bar-code reader and the magnetic strip reader.

10. A method in a peripheral device for updating firmware of the peripheral device, the method comprising: receiving, at a communication circuit of the peripheral device, an update notification from a portable electronic device, the update notification identifying one of at least two memory blocks for receiving updated instructions, determining whether or not the identified one memory block is an active memory block of the peripheral device, responding, via the communication circuit, to the update notification from the portable electronic device, the response acknowledging the update notification if the identified one memory block is the active memory block, and when the response acknowledges receiving an update notification that identifies the active memory block: receiving from the electronic device an updated firmware image, including information designating a memory block of the peripheral device, writing the updated firmware image to the designated memory block upon determining that the memory block identified in the update notification is available for writing, upon receipt of a commit command from the electronic device, designating for execution the memory block to which the received updated firmware image was written, and resetting the peripheral device in order to execute the updated firmware image at the memory block designated for execution, wherein the updated firmware instructions include instructions for managing power transfer from a battery of peripheral device to a device other than the peripheral device.

11. The method according to claim 10, further comprising: receiving, with the indication that the transmission of the updated firmware image is complete, a pre-calculated total checksum for the updated firmware image; comparing the pre-calculated total checksum with a peripheral-device calculated total checksum, and upon determining a match of the pre-calculated total checksum and the peripheral-device calculated checksum, transmitting a confirmation of the match.

12. The method according to claim 10, wherein the responding to the update notification includes indicating an availability status of the peripheral device memory block identified in the update notification.

13. The method according to claim 12, wherein the availability status of the peripheral device memory block identified in the update notification is indicated as not available for receiving the updated firmware image when the identified peripheral device memory block is designated as an active memory block storing firmware for current execution.

14. The method according to claim 12, wherein, the responding to the update notification indicates an error when the identified peripheral device memory block is not available for receiving the updated firmware.

15. The method according to claim 14, wherein, if the response to the update notification indicates the error, the electronic device transmits a secondary update notification that identifies a different peripheral device memory block for receiving the update.

16. The method according to claim 10, further comprising: verifying the received updated firmware image by affirmatively comparing a pre-calculated checksum included with the updated firmware image against a checksum calculated by the peripheral device after receipt of the updated firmware image.

17. The method according to claim 16, wherein the updated firmware image is received by the peripheral device in successive updated firmware image portions, each updated firmware image portion being received, verified, and successfully written to the identified memory block by the peripheral device successfully prior to processing of a subsequent updated firmware image portion.

* * * * *